United States Patent
Marandian Hagh et al.

(10) Patent No.: US 12,515,966 B2
(45) Date of Patent: Jan. 6, 2026

(54) METHOD TO CREATE A LITHIUM MANGANESE NICKEL OXIDE CATHODE USING ULTRA-PURE ELECTROLYTIC MANGANESE DIOXIDE FOR IMPROVED ELECTROCHEMICAL CELL PERFORMANCE

(71) Applicant: GM GLOBAL TECHNOLOGY OPERATIONS LLC, Detroit, MI (US)

(72) Inventors: Nader Marandian Hagh, Franklinville, NJ (US); Li Yang, Troy, MI (US); Vijay P. Saharan, Grand Blanc, MI (US); Laurie Jegaden, Henderson, NV (US)

(73) Assignee: GM Global Technology Operations LLC, Detroit, MI (US)

( * ) Notice: Subject to any disclaimer, the term of this patent is extended or adjusted under 35 U.S.C. 154(b) by 827 days.

(21) Appl. No.: 17/728,342

(22) Filed: Apr. 25, 2022

(65) Prior Publication Data
US 2023/0339776 A1    Oct. 26, 2023

(51) Int. Cl.
*C01G 53/50* (2025.01)
*H01M 10/0525* (2010.01)

(52) U.S. Cl.
CPC ........ *C01G 53/50* (2013.01); *H01M 10/0525* (2013.01); *C01P 2006/80* (2013.01)

(58) Field of Classification Search
CPC ........ C25B 1/21; C01G 53/50; H01M 4/1391; H01M 4/50; H01M 4/505
See application file for complete search history.

(56) References Cited

U.S. PATENT DOCUMENTS 4,083,757 A * 4/1978 Dzhaparidze ............. C25B 1/21
                                                      205/542
5,316,877 A    5/1994 Thackeray
(Continued)

FOREIGN PATENT DOCUMENTS

CN    109467130 A *  3/2019
CN    109678216 A    4/2019
(Continued)

OTHER PUBLICATIONS

Gu, "General Synthesis of MnOx (MnO2, Mn2O3, Mn3O4, MnO) Hierarchical Microspheres as Lithium-ion Battery Anodes", Dec. 1, 2015, Electrochimica Acta, vol. 184, pp. 250-256, https://doi.org/10.1016/j.electacta.2015.10.037 (Year: 2015).*

(Continued)

*Primary Examiner* — Nicholas A Smith
*Assistant Examiner* — Ziheng Lu
(74) *Attorney, Agent, or Firm* — Quinn IP Law

(57) ABSTRACT

A method of forming an LMNO cathode with electrolytic manganese dioxide includes dissolving metallic manganese in acid to create a dissolved manganese solution, disposing the solution within an electrolytic cell including an electrolytic cell anode and an electrolytic cell cathode, and applying a current between the cell anode and the cell cathode to the solution. Applying the current forms an $MnO_2$ deposit upon the cell anode. The method further includes harvesting the deposit, creating a manganese precursor by neutralizing the deposit and grinding the deposit to form an $MnO_2$ powder, and mixing the manganese precursor with a nickel precursor and a lithium precursor to create a mixture. The method further includes calcining the mixture to create an LMNO powder and coating a current collector with the LMNO powder to thereby form the LMNO cathode. The (Continued)

method may include testing the cathode electrode in an electrochemical pouch format cell.

11 Claims, 6 Drawing Sheets

(56) References Cited

U.S. PATENT DOCUMENTS

| | | | |
|---|---|---|---|
| 5,631,104 A | | 5/1997 | Zhong |
| 5,698,176 A | * | 12/1997 | Bowden ................ H01M 4/50 |
| | | | 423/605 |
| 5,746,902 A | * | 5/1998 | Takehara ................ C25B 1/21 |
| | | | 205/539 |
| 6,214,198 B1 | | 4/2001 | Andersen |
| 6,248,477 B1 | | 6/2001 | Howard, Jr. |
| 10,109,858 B1 | * | 10/2018 | Jegaden ................ H01M 4/62 |
| 2002/0168568 A1 | | 11/2002 | Yamaki |
| 2010/0239911 A1 | | 9/2010 | Tahara et al. |
| 2014/0077127 A1 | | 3/2014 | Gao et al. |
| 2019/0229342 A1 | | 7/2019 | Son |

FOREIGN PATENT DOCUMENTS

| | | | | |
|---|---|---|---|---|
| CN | 112499687 A | * | 3/2021 | ............ H01M 4/505 |
| DE | 2332729 A1 | | 1/1975 | |
| DE | 69632586 T2 | | 7/2004 | |
| JP | 4234334 B2 | | 3/2009 | |
| JP | 2011029000 A | * | 2/2011 | |
| WO | WO2023043668 A1 | | 3/2023 | |

OTHER PUBLICATIONS

Tabuchi, "Synthesis of LiMnO2 with a-NaMnO2-Type Structure by a Mixed-Alkaline Hydrothermal Reaction", 1998, Journal of the Electrochemical Society, vol. 145, DOI 10.1149/1.1838411 (Year: 1998).*

Yuan, "A facile preparation of single-crystalline α-Mn2O3 nanorods by ammonia-hydrothermal treatment of MnO2", May 1, 2004, Chemical Physics Letters, vol. 389, pp. 83-86, https://doi.org/10.1016/j.cplett.2004.03.064 (Year: 2004).*

* cited by examiner

METHOD TO CREATE A LITHIUM MANGANESE NICKEL OXIDE CATHODE USING ULTRA-PURE ELECTROLYTIC MANGANESE DIOXIDE FOR IMPROVED ELECTROCHEMICAL CELL PERFORMANCE

INTRODUCTION

The disclosure generally relates to a method to create a lithium manganese nickel oxide cathode using ultra-pure electrolytic manganese dioxide for improved electrochemical cell performance.

A battery or battery system includes one or more battery cells. A lithium-ion cell or lithium-ion battery cell includes operation where, during a discharge cycle, lithium ions move from an anode to a cathode through an electrolyte composition. Lithium ions move in reverse, from the cathode to the anode, during a charging cycle. An electrolyte composition is configured for providing a medium through which the lithium ions may travel during battery operation.

SUMMARY

A method of forming a lithium manganese nickel oxide cathode with electrolytic manganese dioxide is provided. The method includes dissolving metallic manganese in acid to create a dissolved manganese solution, disposing the dissolved manganese solution within an electrolytic cell including an electrolytic cell anode and an electrolytic cell cathode, and applying a current between the electrolytic cell anode and the electrolytic cell cathode to the dissolved manganese solution. Applying the current forms an $MnO_2$ deposit upon the electrolytic cell anode. The method further includes harvesting the $MnO_2$ deposit from the electrolytic cell anode, creating a manganese precursor by neutralizing the $MnO_2$ deposit and grinding the $MnO_2$ deposit to form an $MnO_2$ powder, and mixing the manganese precursor with a nickel precursor and a lithium precursor to create a mixture. The method further includes calcining the mixture to create a lithium manganese nickel oxide powder and coating a current collector with the lithium manganese nickel oxide powder to thereby form the lithium manganese nickel oxide cathode.

In some embodiments, creating the manganese precursor further includes calcining the $MnO_2$ powder under one of atmospheric air and oxygen gas to create $Mn_2O_3$.

In some embodiments, calcining the $MnO_2$ powder includes calcining the $MnO_2$ powder at a temperature of from 700° C. to 950° C. for from 1 hour to 24 hours.

In some embodiments, calcining the $MnO_2$ powder includes calcining the $MnO_2$ powder at a temperature of from 700° C. to 850° C. for 12 hours.

In some embodiments, the manganese precursor includes alkali metal impurities and alkaline earth metal impurities present in an amount of from 10 parts by weight to 100 parts by weight based on one million parts by weight of the manganese precursor.

In some embodiments, the manganese precursor includes particles having a diameter of at least 100 nanometers.

In some embodiments, the manganese precursor includes particles having a diameter of from 100 nanometers to 300 nanometers.

In some embodiments, the manganese precursor has a particle surface area of from 0.5 meters squared per gram to 5 meters squared per gram.

In some embodiments, calcining the mixture includes heating the mixture at a temperature of from 700° C. to 950° C. for from 1 hour to 24 hours.

In some embodiments, applying the current to the dissolved manganese solution includes applying a current density to the electrolytic cell anode and to the electrolytic cell cathode of from 10 amps per meter squared electrode surface area to 100 amps per meter squared electrode surface area.

In some embodiments, applying the current to the dissolved manganese solution includes applying a current density to the electrolytic cell anode and to the electrolytic cell cathode of from 27 amps per meter squared electrode surface area to 64.4 amps per meter squared electrode surface area.

According to one alternative embodiment, a method of forming a battery including a lithium manganese nickel oxide cathode is provided. The method includes providing an anode for the battery, a separator for the battery, and an electrolyte solution for the battery. The method further includes forming the lithium manganese nickel oxide cathode. Forming the lithium manganese nickel oxide cathode includes dissolving metallic manganese in acid to create a dissolved manganese solution, disposing the dissolved manganese solution within an electrolytic cell including an electrolytic cell anode and an electrolytic cell cathode, and applying a current between the electrolytic cell anode and the electrolytic cell cathode to the dissolved manganese solution. Applying the current forms an $MnO_2$ deposit upon the electrolytic cell anode. Forming the lithium manganese nickel oxide cathode further includes harvesting the $MnO_2$ deposit from the electrolytic cell anode, creating a manganese precursor by neutralizing the $MnO_2$ deposit and grinding the $MnO_2$ deposit to form an $MnO_2$ powder, and mixing the manganese precursor with a nickel precursor and a lithium precursor to create a mixture. Forming the lithium manganese nickel oxide cathode further includes calcining the mixture to create a lithium manganese nickel oxide powder and coating a current collector with the lithium manganese nickel oxide powder. The method further includes disposing the separator and the electrolyte solution between the anode for the battery and the lithium manganese nickel oxide cathode to thereby form the battery.

In some embodiments, creating the manganese precursor further includes calcining the $MnO_2$ powder under one of atmospheric air and oxygen gas to create $Mn_2O_3$.

In some embodiments, calcining the $MnO_2$ powder includes heating the $MnO_2$ powder at a temperature of from 700° C. to 950° C. for from 1 hour to 24 hours.

In some embodiments, the manganese precursor includes alkali metal impurities and alkaline earth metal impurities present in from 10 parts by weight to 100 parts by weight based on one million parts by weight of the manganese precursor.

In some embodiments, the manganese precursor includes particles having a diameter of at least 100 nanometers.

In some embodiments, the manganese precursor has a particle surface area of from 0.5 meters squared per gram to 5 meters squared per gram.

In some embodiments, calcining the mixture includes heating the mixture at a temperature of from 700° C. to 950° C. for from 1 hour to 24 hours.

In some embodiments, applying the current to the dissolved manganese solution includes applying a current density to the electrolytic cell anode and to the electrolytic cell cathode of from 10 amps per meter squared electrode surface area to 100 amps per meter squared electrode surface area.

In some embodiments, a device is provided including a lithium manganese nickel oxide cathode formed by the method disclosed herein.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 illustrates the dissolved manganese solution disposed between the anode and the cathode prior to current being provided to the anode and the cathode;

FIG. 3 schematically illustrates the industrial electrolytic cell after current has been applied to the dissolved manganese solution and an $MnO_2$ deposit has formed upon the anode of FIG. 2;

DETAILED DESCRIPTION

Figure 1:
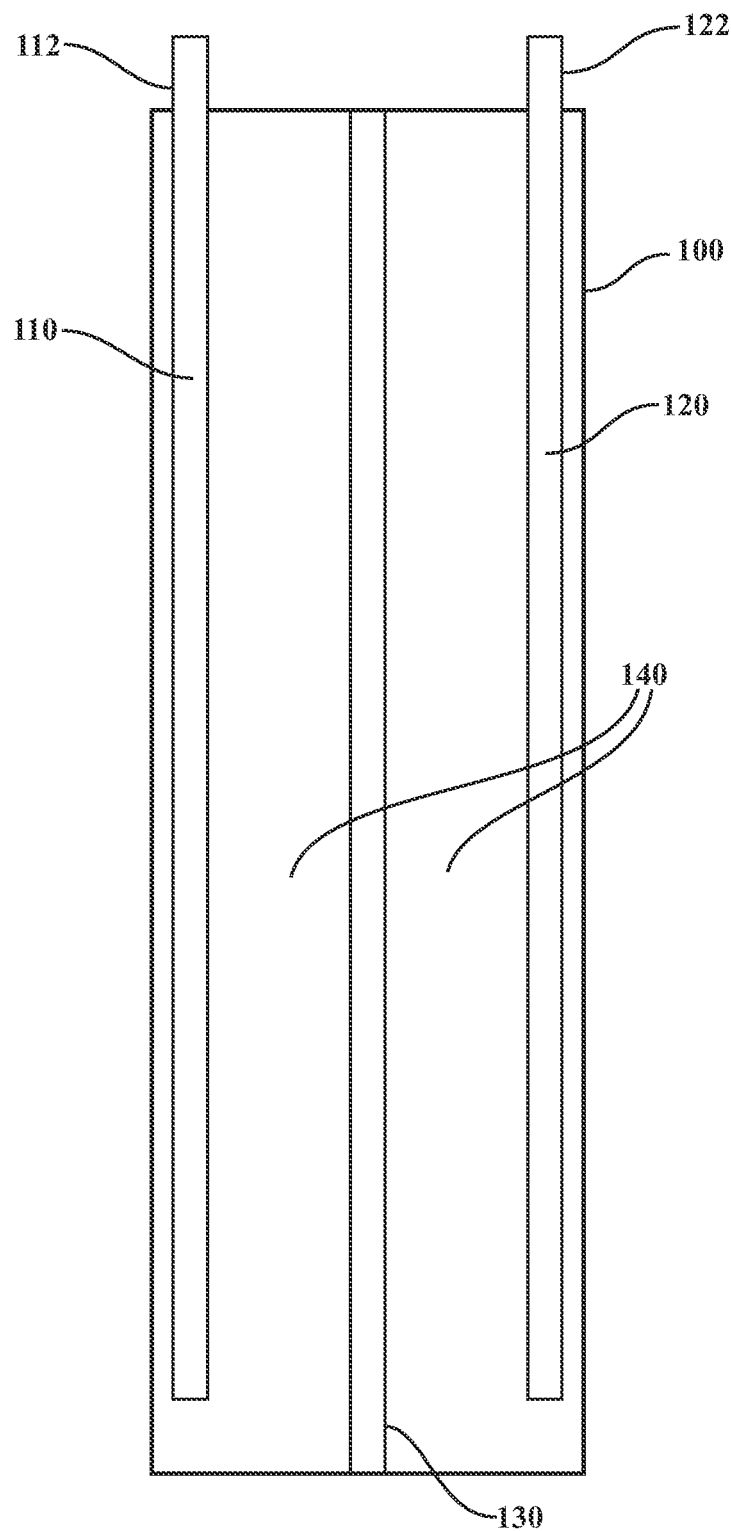
FIG. 1 schematically illustrates an exemplary battery cell, including an anode, a cathode, a separator, and an electrolyte composition, in accordance with the present disclosure.

The disclosed methods and device utilize an ultra-pure manganese precursor as a starting material for synthesis of high voltage (4.7V) $LiNi_xMn_yO_z$ (LMNO) that is useful as a cathode material, wherein x=0.4-0.6, y=1.45-1.55, z=3.8-4.0. In one embodiment, the LNMO may be represented as $LiNi_{0.5}Mn_{1.5}O_4$. In one embodiment, the ultra-pure manganese precursor includes electrolytic manganese dioxide (EMD) or $MnO_2$. In another embodiment, ultra-pure manganese precursor includes $Mn_2O_3$ (manganese (III) oxide).

A process to create ultra-pure manganese precursor involves converting metallic manganese to manganese oxide. Manganese precursor produced by some processes may include impurities, such as alkali metals (such as sodium and potassium) and alkaline earth metals (such as calcium) present in quantities of 200 parts per million (ppm) or more. The disclosed process enables production of the ultra-pure manganese precursor with such impurities present in quantities of 50 ppm to 100 ppm.

The ultra-pure manganese precursor may be created as a powder. In a first step to create the ultra-pure manganese precursor, metallic manganese is converted to manganese dioxide ($MnO_2$). This conversion may include dissolving metallic manganese in either sulfuric or nitric acids to create a dissolved manganese solution, maintaining the manganese concentration at a concentration of from 20 grams per liter to 100 grams per liter. In one embodiment, the manganese concentration may be about 47 grams/liter. The dissolved manganese solution may include a pH of from 5.5 to 7.0. The dissolved manganese solution is passed through and subjected to an electric current within at least one industrial electrolytic cell with a temperature being maintained at from 93° C. to 99° C. and with current density of an anode within the electrolytic cell being maintained at from 10 amps per square meter to 100 amps per square meter. In one embodiment, the current densities of the anode within the electrolytic cell may be maintained at from 27 amps per square meter to 64.4 amps per square meter. The industrial electrolytic cell is useful to harvest $MnO_2$ from the dissolved manganese solution and is distinct from the electric cell to be created utilizing the disclosed LMNO cathode. The dissolved manganese solution, as it is passed through the industrial electrolytic cell, deposits $MnO_2$ upon the anode of the industrial electrolytic cell. The deposited $MnO_2$ is collected from the anode. This collected $MnO_2$ is ground and neutralized using a basic solution such as an ammonium hydroxide solution. After neutralization, the $MnO_2$ particles are ground to create a $MnO_2$ powder or EMD powder. In one embodiment, this EMD powder may be utilized to create LNMO cathodes. In another embodiment wherein $Mn_2O_3$ powder is to be utilized to create LNMO cathodes, the $MnO_2$ powder may be calcined at a temperature of from 700° C. to 950° C. for from 1 hour to 24 hours under one of atmospheric air and oxygen gas, which results in the $MnO_2$ being oxidized to $Mn_2O_3$. In one embodiment, the $MnO_2$ powder may be calcined at temperature of from 700° C. to 850° C. for 12 hours. The created manganese precursor may include particles having a diameter of greater than 100 nanometers, or from 100 nanometers to 300 nanometers, or may have a particle surface area of from 0.5 meters squared per gram to 5 meters squared per gram.

The manganese precursor powder may be utilized to create an LNMO cathode powder. Appropriate molar ratios of EMD or $Mn_2O_3$, $NiCO_3$ and $Li_2CO_3$ are mixed and calcined in a temperature of from 700° C. to 950° C. for from 1 hours to 24 hours. This results in creation of the LNMO cathode powder which may be utilized to form the cathode.

A device embodied as a cathode created by the disclosed method provides excellent cathode utilization, excellent Coulombic efficiency and excellent cycle life when is used in a lithium-ion battery cell. Battery cell performance may be additionally improved through use of an electrolyte additive.

A plurality of electrolyte solutions may be utilized with the disclosed LNMO cathode. For example, either a carbonate-based electrolyte or a boron-based electrolyte may be utilized in a battery equipped with the LNMO cathode. Additionally, an electrolyte additive may be utilized to enhance operation of the battery. In one example, fluorinated-based electrolyte additives may be utilized. The disclosed method to create LNMO cathodes and the LNMO cathodes with reduced impurities may operate more efficiently in the battery and may interact with the utilized electrolyte solution and/or the utilized electrolyte additives based upon improved control over the chemical reactions taking place in the battery. With fewer impurities present in the cathode, fewer unintended side reactions take place in the battery.

Referring now to the drawings, wherein like reference numbers refer to like features throughout the several views, FIG. 1 schematically illustrates an exemplary battery 100, including an anode 110, a cathode 120, a separator 130, and an electrolyte solution 140. The battery 100 may be described as a battery cell or a battery system. The battery 100 enables converting electrical energy into stored chemical energy in a charging cycle, and the battery 100 enables converting stored chemical energy into electrical energy in a discharging cycle. The anode 110 includes a first current collector 112. The cathode 120 includes a second current collector 122. The first current collector 112 and the second current collector 122 may be constructed with copper, aluminum, or other non-reactive conducting material that may be utilized within the battery 100. The separator 130 is operable to separate the anode 110 from the cathode 120 and to enable ion transfer through the separator 130. The electrolyte solution 140 is a liquid and/or gel that provides a lithium-ion conduction path between the anode 110 and the cathode 120.

The cathode 120 includes LNMO material created and formed upon the cathode 120 in accordance with the method described herein.

Figure 2:
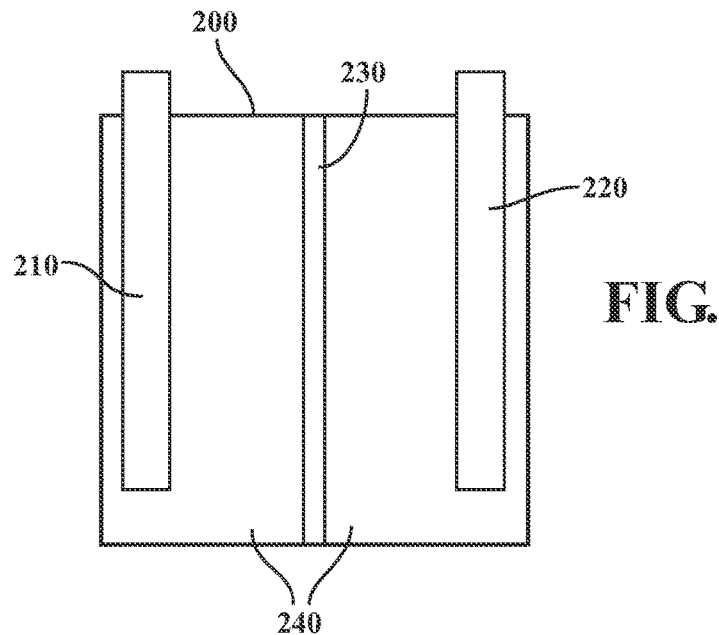
FIGS. 2 and 3 schematically illustrate an industrial electrolytic cell useful for harvesting $MnO_2$ from a dissolved manganese solution, in accordance with the present disclosure.
Figure 3:
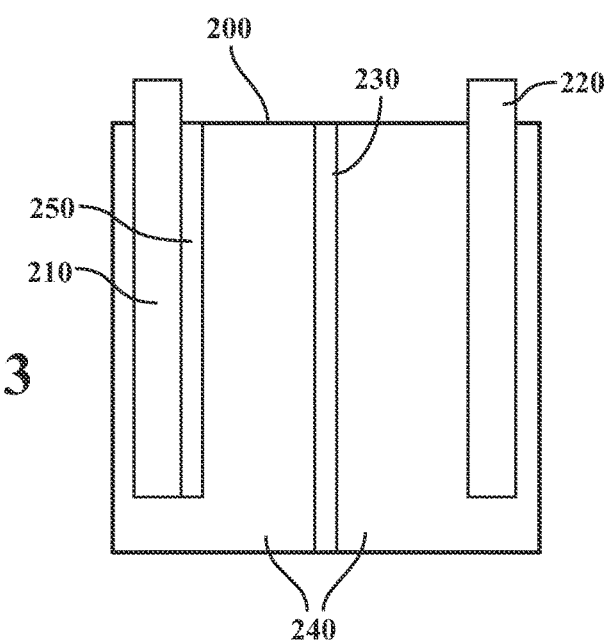

The battery 100 and the components thereto include the cathode 120 to be created by the methods disclosed herein. FIGS. 2 and 3 schematically illustrate an industrial electrolytic cell 200 useful to harvest $MnO_2$ from a dissolved manganese solution 240. The electrolytic cell 200, an anode 210, and a cathode 220, which are used to harvest $MnO_2$, are distinct from the battery 100, the anode 110, and the cathode 120 of FIG. 1, which include the cathode 120 formed with the harvested $MnO_2$. The industrial electrolytic cell 200 is configured for receiving a current from an external power source to create a current flow between the anode 210 and the cathode 220 within the industrial electrolytic cell 200. The dissolved manganese solution 240 is disposed within the industrial electrolytic cell 200 between the anode 210 and the cathode 220. The dissolved manganese solution 240 may be mixed with an electrolyte solution. The industrial electrolytic cell 200 further includes a separator 230 configured for enabling ion transfer through the separator 230.

FIG. 2 illustrates the dissolved manganese solution 240 disposed between the anode 210 and the cathode 220 prior to current being provided to the anode 210 and the cathode 220. FIG. 3 schematically illustrates the industrial electrolytic cell 200 after current has been applied to the dissolved manganese solution 240, and an $MnO_2$ deposit 250 has formed upon the anode 210.

Figure 4:
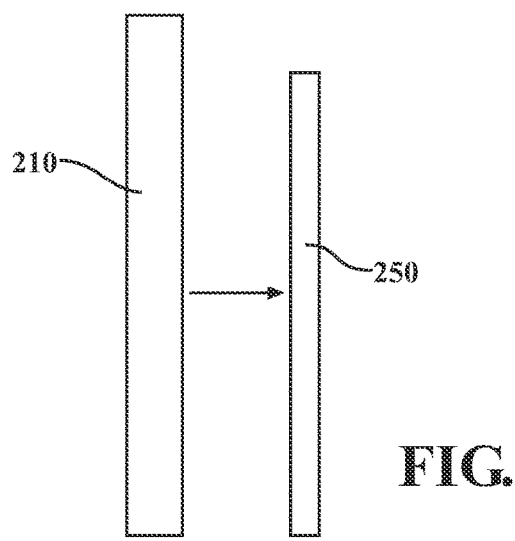
FIG. 4 illustrates the anode of FIG. 3 with the $MnO_2$ deposit of FIG. 3 removed from a surface of the anode, in accordance with the present disclosure.

FIG. 4 illustrates the anode 210 with the $MnO_2$ deposit 250 removed from a surface of the anode 210. The anode 210 may be removed from the industrial electrolytic cell 200 of FIG. 2 for the purpose of harvesting the $MnO_2$ deposit 250. The $MnO_2$ deposit 250 may be subsequently neutralized and ground as part of the disclosed process to create EMD and/or EMD further oxidized to $Mn_2O_3$. The anode 210 may subsequently be placed or reinstalled within the industrial electrolytic cell 200 for repeated cycles of harvesting the $MnO_2$ deposits 250.

Figure 5:
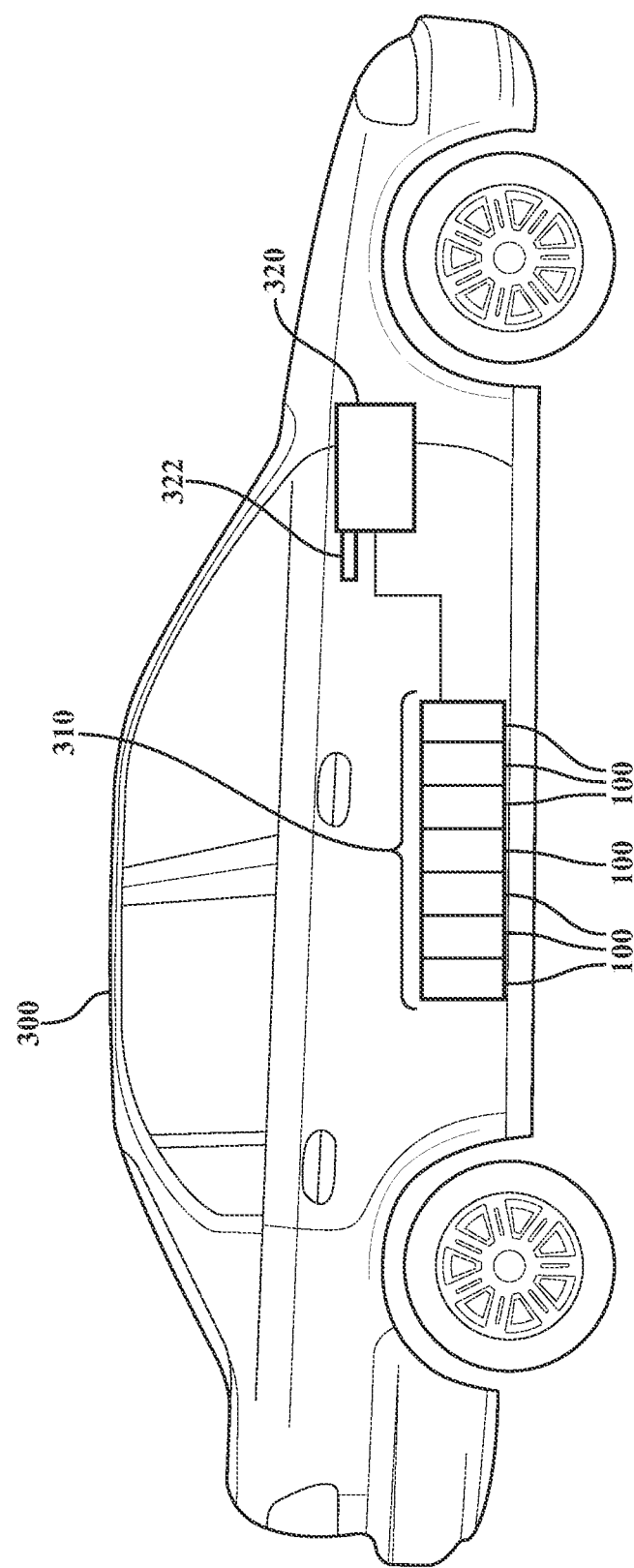
FIG. 5 schematically illustrates an exemplary device, e.g., a battery electric vehicle (BEV), including a battery pack that includes a plurality of batteries, in accordance with the present disclosure.

The battery 100 may be utilized in a wide range of applications and powertrains. FIG. 5 schematically illustrates an exemplary device 300, e.g., a battery electric vehicle (BEV), including a battery pack 310 that includes a plurality of batteries 100. The plurality of batteries 100 may be connected in various combinations, for example, with a portion being connected in parallel and a portion being connected in series, to achieve goals of supplying electrical energy at a desired voltage. The battery pack 310 is illustrated as electrically connected to a motor generator unit 320 useful to provide motive force to the vehicle 300. The motor generator unit 320 may include an output component 322, for example, an output shaft, which provides mechanical energy useful to provide the motive force to the vehicle 300. A number of variations to vehicle 300 are envisioned, and the disclosure is not intended to be limited to the examples provided.

Figure 6:
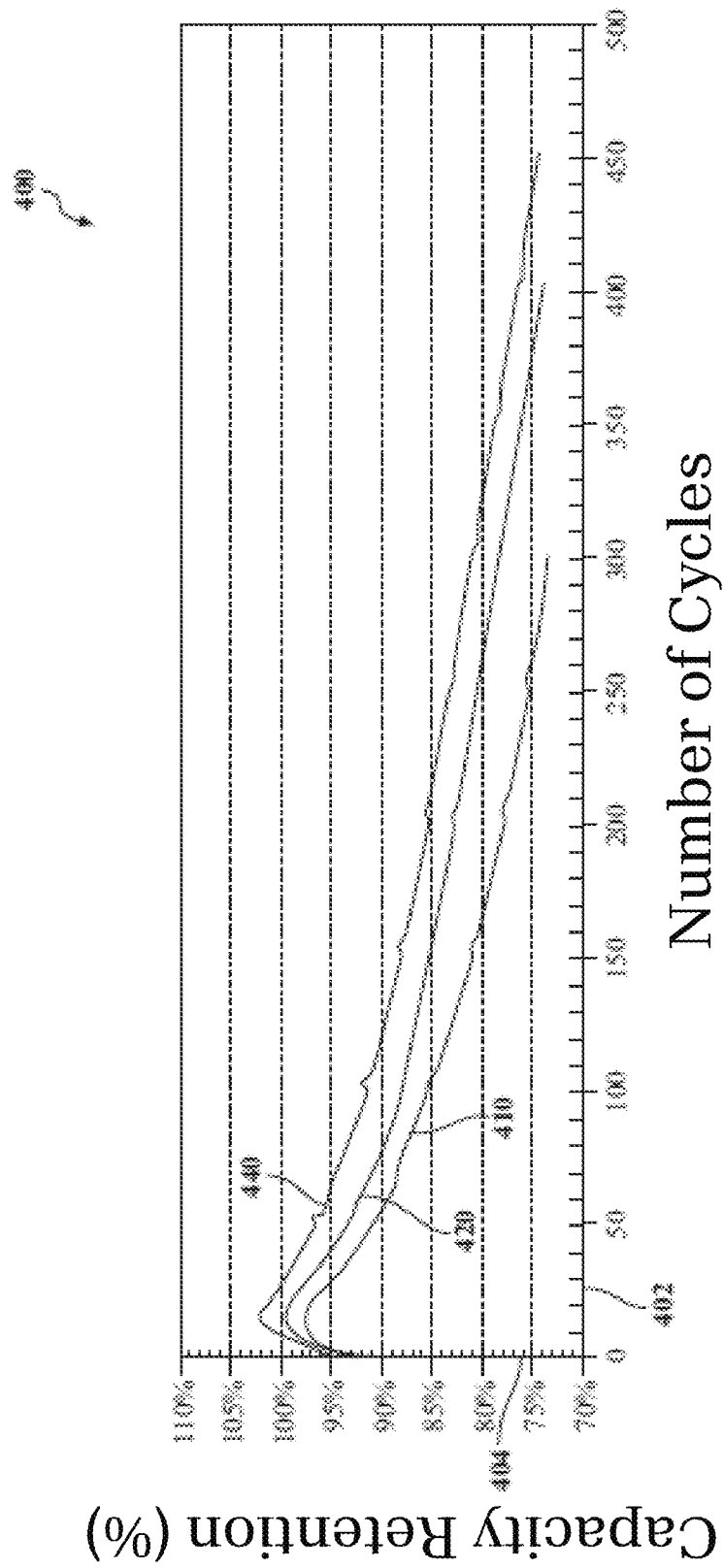
FIG. 6 is a graph illustrating an effect of an electrolyte additive and an lithium manganese nickel oxide (LNMO) purity on battery capacity retention for a plurality of batteries, in accordance with the present disclosure.

FIG. 6 is a graph 400 illustrating an effect of an electrolyte additive and an LNMO purity on battery capacity retention for a plurality of batteries. A horizontal axis 402 is illustrated describing cycles or a number of cycles, illustrating aging effects upon a battery over time. A vertical axis 404 is illustrated describing capacity retention of a battery as a percentage of an initial maximum capacity of the battery. Plot 410, plot 420, and plot 440 are illustrated, representing capacity retention over time for four batteries of differing configurations. The plot 410 represents capacity retention over time for a baseline battery. The plot 420 illustrates capacity retention over time for a battery including an electrolyte additive. The plot 440 illustrates capacity retention over time for the battery 100 including a high voltage (4.7V) LNMO cathode created with an ultra-pure EMD powder. The plot 420 illustrates improvement over the plot 410. The plot 440 illustrates improvement in capacity retention over time in the battery including the LNMO cathode as compared to each of the plots 410 and 420.

Figure 7:
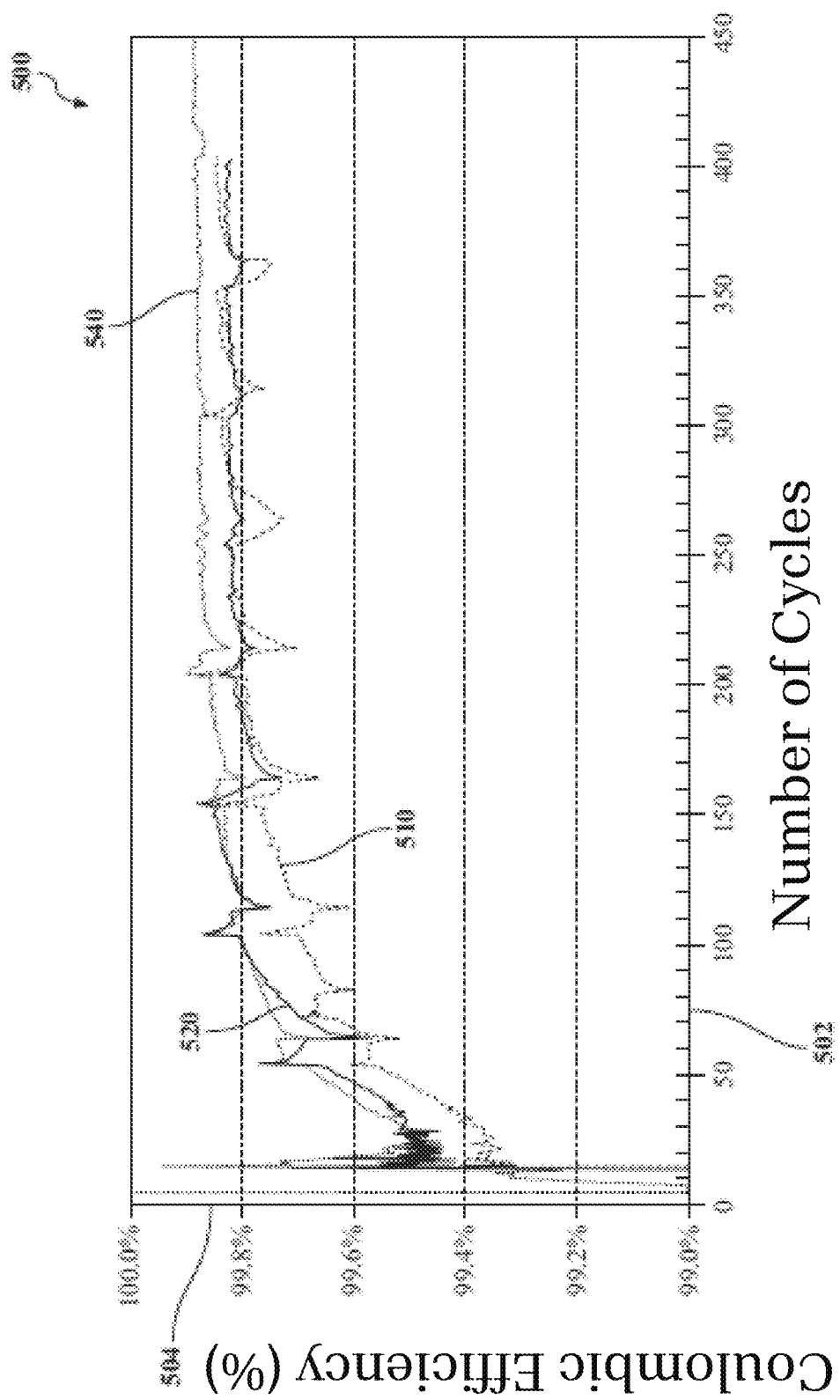
FIG. 7 is a graph illustrating an effect of an electrolyte additive and an LNMO purity on Coulombic efficiency for a plurality of batteries embodied as single layer pouch battery cells, in accordance with the present disclosure.

FIG. 7 is a graph 500 illustrating an effect of an electrolyte additive and an LNMO purity on Coulombic efficiency for a plurality of batteries embodied as single layer pouch battery cells. A horizontal axis 502 is illustrated describing cycles or a number of cycles, illustrating aging effects upon a battery over time. A vertical axis 504 is illustrated describing Coulombic efficiency of a battery as a percentage. Plot 510, plot 520, and plot 540 are illustrated, representing Coulombic efficiency over time for four batteries of differing configurations. The plot 510 represents Coulombic efficiency over time for a baseline battery. The plot 520 illustrates Coulombic efficiency over time for a battery including an electrolyte additive. The plot 540 illustrates Coulombic efficiency over time for a battery including a high voltage (4.7V) LNMO cathode created with an ultra-pure EMD powder. One may see that the battery equipped with the LNMO cathode exhibits excellent efficiency as compared to the other batteries.

Figure 8:
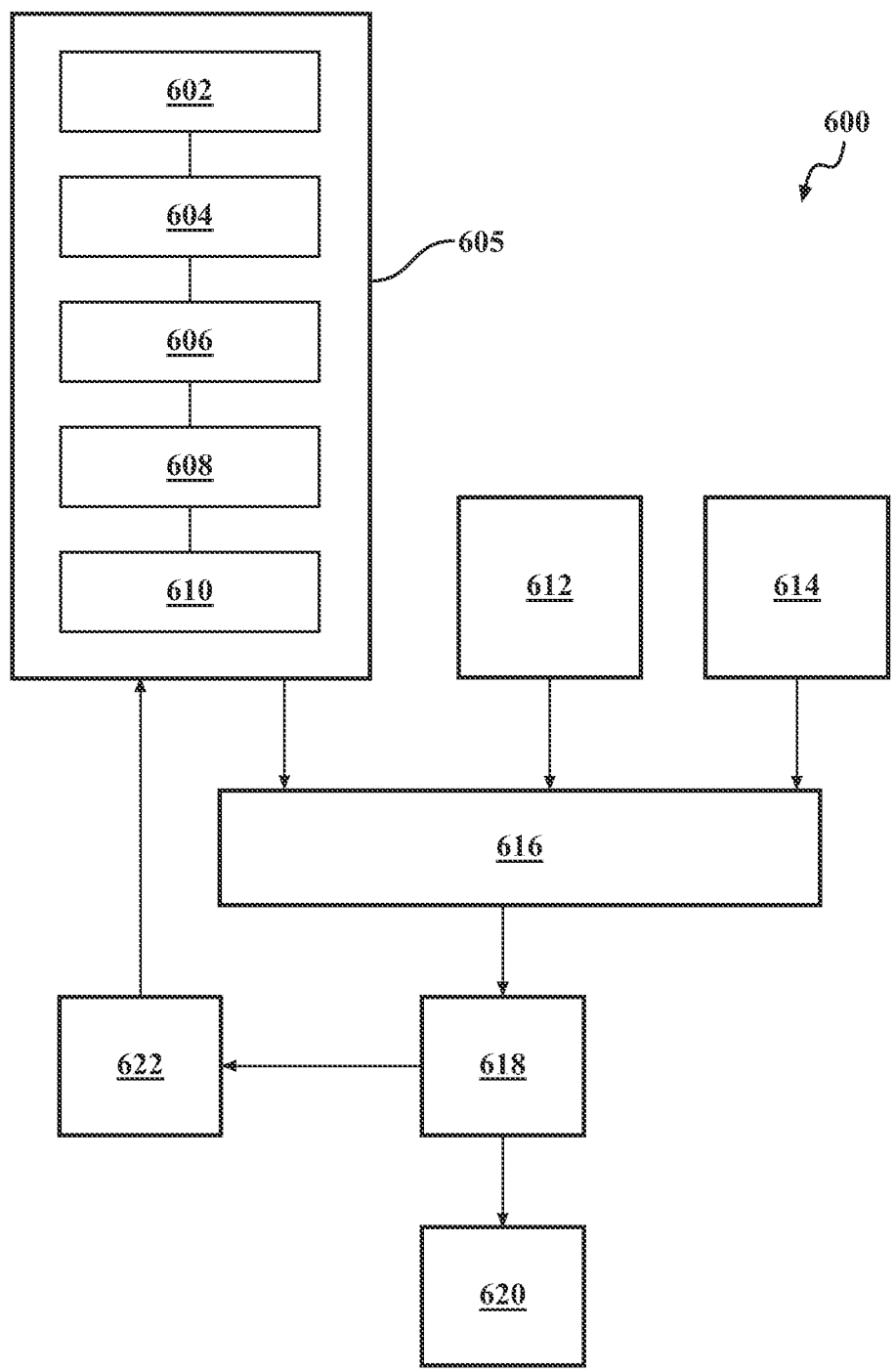
FIG. 8 schematically illustrates a workflow of a disclosed method of forming a lithium manganese nickel oxide cathode and a battery containing the cathode, in accordance with the present disclosure.

FIG. 8 schematically illustrates a workflow 600 of the disclosed method of forming the LMNO cathode. An ultra-pure manganese precursor creation process 605 is illustrated, including a step 602 where metallic manganese is provided. Step 604 is illustrated where the metallic manganese is dissolved in acid to create a dissolved manganese solution. Step 606 is illustrated where the dissolved manganese is processed through an industrial electrolytic cell such that $MnO_2$ is deposited upon an anode of the industrial electrolytic cell. Step 608 is illustrated where the $MnO_2$ deposited upon the anode is harvested. At step 610, the harvested $MnO_2$ is neutralized and ground. An additional, optional step may be performed, wherein the neutralized and ground $MnO_2$ may be calcined in order to be oxidized to an $Mn_2O_3$ powder. The ultra-pure manganese precursor may be alternatively described as a manganese precursor including alkali metal or alkaline earth metal impurities present in an amount from 10 parts per million to 100 parts per million.

At step 612, a nickel precursor such as nickel carbonate powder is provided. At step 614, a lithium precursor such as lithium carbonate powder is provided. At step 616, the manganese precursor powder from step 610, the nickel precursor from step 612, and the lithium precursor from step 614 are mixed and calcinated to create LNMO for use to create a cathode. At step 618, the LMNO is utilized to fabricate or create a cathode, for example, forming the LMNO as a cathode electrode upon a current collector. At step 620, the cathode is utilized to create a battery, which may be used in a wide variety of systems and devices. At optional step 622, the cathode and/or a battery created with the cathode may be tested and the results may be evaluated. These evaluated test results may be provided back to the EMD creation process 605 for a purpose of optimizing the ultra-pure manganese precursor creation process 605. A number of variations to the disclosed method and to workflow 600 are envisioned, and the disclosure is not intended to be limited to the exemplary embodiments provided herein.

A variety of alternative lithium precursors may be utilized in the disclosed method. Examples include lithium hydroxide (LiOH), lithium hydroxide monohydrate (LiOH·H2O), lithium nitrate ($LiNO_3$), lithium tert-butoxide ($LiOC(CH_3)_3$), lithium isopropoxide ($LiCHO(CH_3)_2$), and lithia or lithium oxide ($Li_2O$).

A variety of alternative nickel precursors may be utilized in the disclosed method. Examples include nickel oxides, including different oxidation states of nickel oxides such as NiO and $Ni_2O_3$, nickel tetracarbonyl ($Ni(CO)_4$), nickel nitrate ($Ni(NO_3)_2$), nickel sulfate ($NiSO_4$), nickel isopropoxide ($Ni(OC_3H_7)_2$), and metallic nickel.

Ultra-pure precursor further improved the pouch cell testing vs. conventional precursor. A lack or low amount of impurities in ultra-pure precursor is expected to minimize side reactions between: impurity particles and electrolyte and impurity particles and lithium ions. This reduces the possibility of new compound formation. Additionally, impurity particles may also migrate to different parts of a pouch cell, including separator and anode electrode, triggering multiple failure mechanisms such as self-discharge and/or an increase in cell resistance. Reducing impurities in the cathode reduces the impurities present to migrate to the anode.

All of the above conditions such as electrolyte-impurity or Li ion-impurity interactions can be exacerbated under elevated temperature, high voltage, or both.

Pouch cell testing of samples of the formed electrodes enables adjustment of the process to create better subsequent cathodes with the disclosed precursors. This enables excellent contrast between LMNO precursor with an average amount of impurities and ultra-pure LMNO precursor.

While the best modes for carrying out the disclosure have been described in detail, those familiar with the art to which this disclosure relates will recognize various alternative designs and embodiments for practicing the disclosure within the scope of the appended claims.

What is claimed is:

1. A method of forming a battery including a lithium manganese nickel oxide cathode, the method comprising:
    providing an anode for the battery, a separator for the battery, and an electrolyte solution for the battery;
    forming the lithium manganese nickel oxide cathode, wherein the forming includes:
        dissolving metallic manganese in acid to create a dissolved manganese solution;
        disposing the dissolved manganese solution within an electrolytic cell, the electrolytic cell including an electrolytic cell anode and an electrolytic cell cathode;
        applying a current between the electrolytic cell anode and the electrolytic cell cathode to the dissolved manganese solution, wherein applying the current forms a manganese dioxide ($MnO_2$) deposit upon the electrolytic cell anode;
        harvesting the $MnO_2$ deposit from the electrolytic cell anode;
        creating a manganese precursor by neutralizing the $MnO_2$ deposit and grinding the $MnO_2$ deposit to form an $MnO_2$ powder;
        mixing the manganese precursor with a nickel precursor and a lithium precursor to create a mixture;
        calcining the mixture to create a lithium manganese nickel oxide powder;
        coating a current collector with the lithium manganese nickel oxide powder; and
    disposing the separator and the electrolyte solution between the anode for the battery and the lithium manganese nickel oxide cathode to thereby form the battery,
    wherein creating the manganese precursor further includes calcining the $MnO_2$ powder under one of atmospheric air and oxygen gas to create manganese (III) oxide ($Mn_2O_3$); and
    wherein the manganese precursor includes alkali metal impurities and alkaline earth metal impurities present in from 10 parts by weight to 100 parts by weight based on one million parts by weight of the manganese precursor.

2. The method of claim 1, wherein calcining the $MnO_2$ powder includes calcining the $MnO_2$ powder at a temperature of from 700° C. to 950° C. for from 1 hour to 24 hours.

3. The method of claim 1, wherein the manganese precursor includes particles having a diameter of at least 100 nanometers.

4. The method of claim 1, wherein the manganese precursor has a particle surface area of from 0.5 meters squared per gram to 5 meters squared per gram.

5. The method of claim 1, wherein calcining the mixture includes heating the mixture at a temperature of from 700° C. to 950° C. for from 1 hour to 24 hours.

6. The method of claim 1, wherein applying the current to the dissolved manganese solution includes applying a current density to the electrolytic cell anode and to the electrolytic cell cathode of from 10 amps per meter squared electrode surface area to 100 amps per meter squared electrode surface area.

7. The method of claim 3, wherein the manganese precursor includes particles having a diameter of from 100 nanometers to 300 nanometers.

8. The method of claim 6, wherein applying the current to the dissolved manganese solution includes applying a current density to the electrolytic cell anode and to the electrolytic cell cathode of from 27 amps per meter squared electrode surface area to 64.4 amps per meter squared electrode surface area.

9. The method of claim 1, wherein the lithium manganese nickel oxide cathode comprises lithium manganese nickel oxide ($LiNi_xMn_yO_z$), wherein x=0.4-0.6, y=1.45-1.55, and z=3.8-4.0.

10. The method of claim 9, wherein the lithium manganese nickel oxide cathode comprises lithium manganese nickel oxide ($LiNi_{0.5}Mn_{1.5}O_4$).

11. The method of claim 1, wherein calcining the MnO2 powder includes calcining the McO2 powder at a temperature of from 700° C. to 850° C. for 12 hours.

\* \* \* \* \*